(12) United States Patent
Wallace (10) Patent No.: US 7,083,161 B2
(45) Date of Patent: Aug. 1, 2006

(54) METHOD AND APPARATUS FOR PROVIDING VACUUM ISOLATION

(75) Inventor: Jay Wallace, Danvers, MA (US)

(73) Assignee: Tokyo Electron Limited, Tokyo (JP)

( * ) Notice: Subject to any disclaimer, the term of this patent is extended or adjusted under 35 U.S.C. 154(b) by 31 days.

(21) Appl. No.: 10/813,660

(22) Filed: Mar. 31, 2004

(65) Prior Publication Data
US 2005/0218365 A1    Oct. 6, 2005

(51) Int. Cl.
*F16K 1/16* (2006.01)
*B65G 53/46* (2006.01)

(52) U.S. Cl. .................. 251/301; 251/335.3; 414/221; 414/939

(58) Field of Classification Search ................ 251/298, 251/301; 414/217, 217.1, 221, 939
See application file for complete search history.

(56) References Cited
U.S. PATENT DOCUMENTS 3,916,949 A * 11/1975 Armstrong .................. 251/301
5,567,909 A * 10/1996 Sugarman et al. .......... 136/201
5,679,596 A * 10/1997 Lu .............................. 438/396
6,386,511 B1 * 5/2002 Watanabe et al. ........... 251/301

* cited by examiner

*Primary Examiner*—Edward K. Look
*Assistant Examiner*—John K. Fristoe, Jr.
(74) *Attorney, Agent, or Firm*—Pillsbury Winthrop Shaw Pittman LLP (57) ABSTRACT

A gate valve assembly provides vacuum isolation between a first treatment system and a second treatment system. The gate valve assembly includes an actuator rotatably coupled to at least one of the first treatment system and the second treatment system, and configured to operate an actuator assembly that has an actuator arm slidably coupled to the actuator. The actuator arm has a distal end coupled to an isolation gate through a vacuum feed-through, wherein the vacuum feed-through is configured to preserve vacuum with the first treatment system and the second treatment system. The isolation gate is configured to rotate about the gate hinge when the actuator arm is translated, and to close a transfer slot between the first treatment system and the second treatment system, or open the transfer slot between the first treatment system and the second treatment system.

14 Claims, 9 Drawing Sheets

METHOD AND APPARATUS FOR PROVIDING VACUUM ISOLATION

CROSS-REFERENCE TO RELATED APPLICATIONS

This application is related to co-pending U.S. patent application Ser. No. 10/705,201, entitled "Processing System and Method for Treating a Substrate", filed on Nov. 12, 2003; co-pending U.S. patent application Ser. No. 10/705,200, entitled "Processing System and Method for Chemically Treating a Substrate", filed on Nov. 12, 2003; and co-pending U.S. patent application Ser. No. 10/704,969, entitled "Processing System and Method for Thermally Treating a Substrate", filed on Nov. 12, 2003; and co-pending U.S. patent application Ser. No. 10/705,397, entitled "Method and Apparatus for Thermally Insulating Adjacent Temperature Controlled Processing Chambers", filed on Nov. 12, 2003. The entire contents of all of those applications are herein incorporated by reference in their entirety.

FIELD OF THE INVENTION

The present invention relates to a method and apparatus for providing vacuum isolation between two treatment systems.

BACKGROUND OF THE INVENTION

During the fabrication of integrated circuits (ICs) in semiconductor manufacturing, a substrate, upon which the IC devices are formed, proceeds through numerous steps and a variety of processes in the evolution of the IC. These processes include etch processes for the removal of material, deposition processes for the formation of material, etc., wherein each process can require a separate treatment system for executing each process. Many processes are performed under vacuum conditions. As a result, the interconnection of treatment systems generally requires an apparatus for providing vacuum isolation, thereby permitting the execution of a process in a treatment system at a vacuum pressure different than the pressure of an adjacent treatment system. Typically, a gate valve can be utilized to provide vacuum isolation between adjacent treatment systems, wherein the valve housing is mounted below the connection of the adjacent treatment systems, and the gate valve translates vertically between open and closed positions. However, the use of such gate valves leads to the occupation of valuable floor space between such treatment systems, hence, interrupting access to the treatment systems during maintenance intervals by an operator.

SUMMARY OF THE INVENTION

According to one aspect of the invention, a gate valve assembly for providing vacuum isolation between a first treatment system and a second treatment system is described comprising: an actuator rotatably coupled to at least one of the first treatment system and the second treatment system; an actuator assembly comprising an actuator arm slidably coupled to the actuator, the actuator arm having a distal end; a vacuum feed-through coupled to the actuator assembly and at least one of the first treatment system and the second treatment system, and configured to preserve vacuum with the first treatment system and the second treatment system; and an isolation gate coupled to the distal end of the actuator arm having a gate hinge coupled to at least one of the first treatment system and the second treatment system, and configured to rotate about the gate hinge, wherein a translation of the actuator arm by the actuator causes the isolation gate to rotate about the gate hinge, and to perform closing a transfer slot between the first treatment system and the second treatment system, or opening the transfer slot between the first treatment system and the second treatment system.

Additionally, according to another aspect, a method of operating a compact gate valve assembly for providing vacuum isolation between a first treatment system and a second treatment system comprises: translating an actuator assembly using an actuator rotatably coupled to at least one of the first treatment system and the second treatment system, wherein the actuator assembly comprises an actuator arm slidably coupled to the actuator configured to extend through a vacuum feed-through coupled to the actuator assembly and at least one of the first treatment system and the second treatment system, and couple with an isolation gate having a gate hinge coupled to at least one of the first treatment system and the second treatment system; and rotating the isolation gate about the gate hinge in a first direction to close a transfer slot between the first treatment system and the second treatment system, and in a second direction opposing the first direction to open the transfer slot.

DETAILED DESCRIPTION OF SEVERAL EMBODIMENTS

Figure 1A:
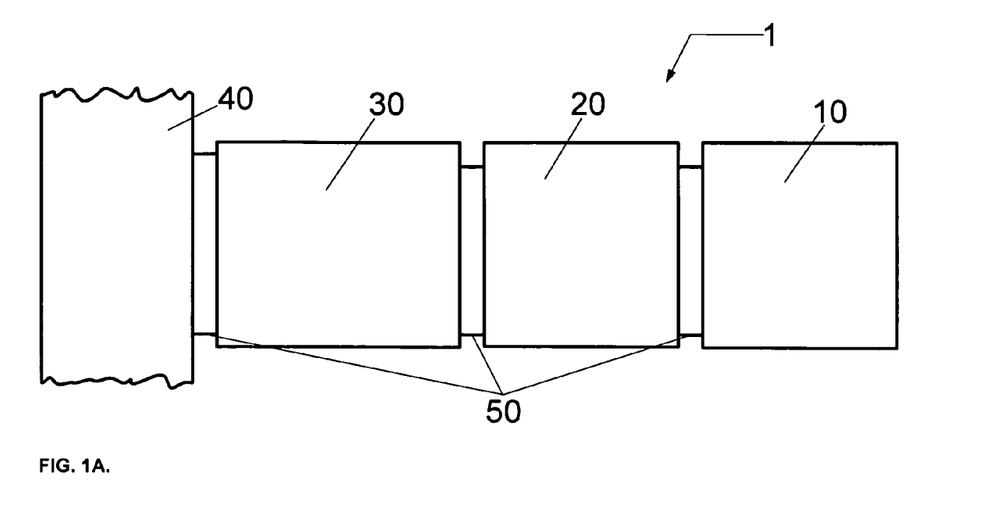
FIG. 1A illustrates a schematic representation of a transfer system having a first treatment system and a second treatment system according to a embodiment of the present invention.

According to one embodiment, FIG. 1A presents a processing system 1 for processing a substrate comprising a first treatment system 10, and a second treatment system 20 coupled to the first treatment system 10. For example, the first treatment system 10 can comprise a chemical treatment system, and the second treatment system 20 can comprise a thermal treatment system. Alternately, the second treatment system 20 can comprise a substrate rinsing system, such as a water rinsing system. Also, as illustrated in FIG. 1A, a transfer system 30 can be coupled to the second treatment system 20 in order to transfer substrates into and out of the second treatment system 20 and the first treatment system 10, and exchange substrates with a multi-element manufacturing system 40. The first and second treatment systems 10, 20, and the transfer system 30 can, for example, comprise a processing element within the multi-element manufacturing system 40. For example, the multi-element manufacturing system 40 can permit the transfer of substrates to and from processing elements including such devices as etch systems, deposition systems, coating systems, patterning systems, metrology systems, etc. In order to isolate the processes occurring in the first and second systems, an isolation assembly 50 can be utilized to couple each system. For instance, the isolation assembly 50 comprises a gate valve assembly to provide vacuum isolation. Additionally, the isolation assembly can further comprise a thermal insulation assembly to provide thermal isolation. Of course, treatment systems 10 and 20, and transfer system 30 can be placed in any sequence.

Figure 1B:
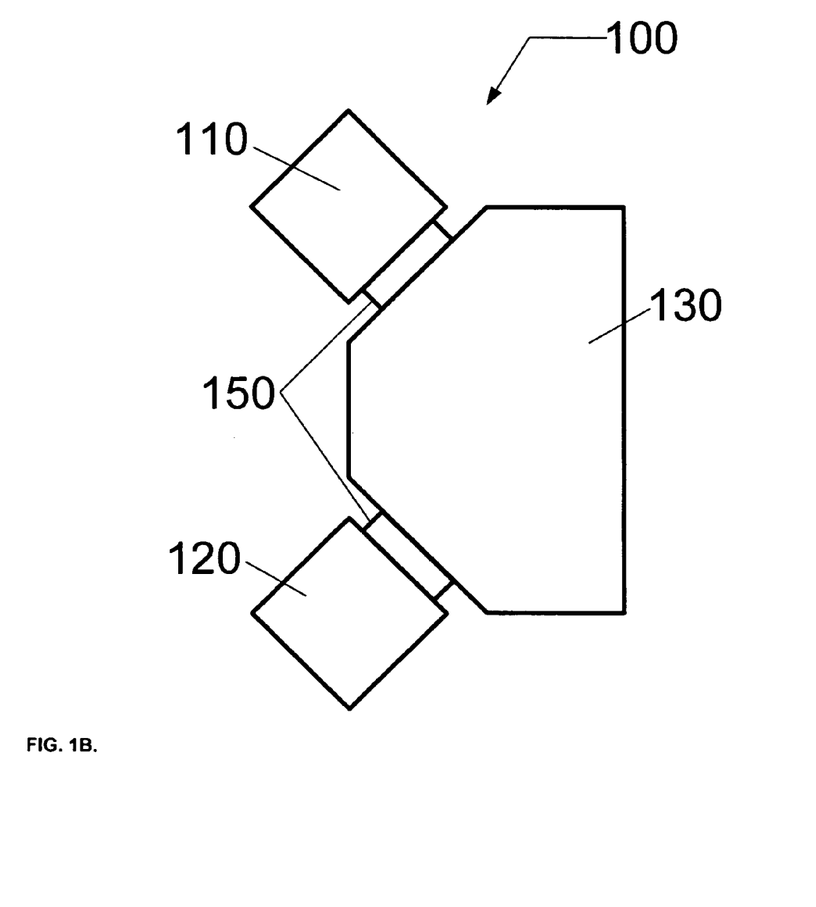
FIG. 1B illustrates a schematic representation of a transfer system having a first treatment system and a second treatment system according to another embodiment of the present invention.

Alternately, in another embodiment, FIG. 1B presents a processing system 100 comprising a first treatment system 110, and a second treatment system 120. For example, the first treatment system 110 can comprise a chemical treatment system, and the second treatment system 120 can comprise a thermal treatment system. Alternately, the second treatment system 120 can comprise a substrate rinsing system, such as a water rinsing system. Also, as illustrated in FIG. 1B, a transfer system 130 can be coupled to the first treatment system 110 in order to transfer substrates into and out of the first treatment system 110, and can be coupled to the second treatment system 120 in order to transfer substrates into and out of the second treatment system 120. Additionally, transfer system 130 can exchange substrates with one or more substrate cassettes (not shown). Although only two process systems are illustrated in FIG. 1B, other process systems can access transfer system 130 including such devices as etch systems, deposition systems, coating systems, patterning systems, metrology systems, etc. In order to isolate the processes occurring in the first and second treatment systems, an isolation assembly 150 can be utilized to couple each system. For instance, the isolation assembly 150 comprises a gate valve assembly to provide vacuum isolation. Additionally, the isolation assembly 150 can further comprise a thermal insulation assembly to provide thermal isolation.

Figure 1C:
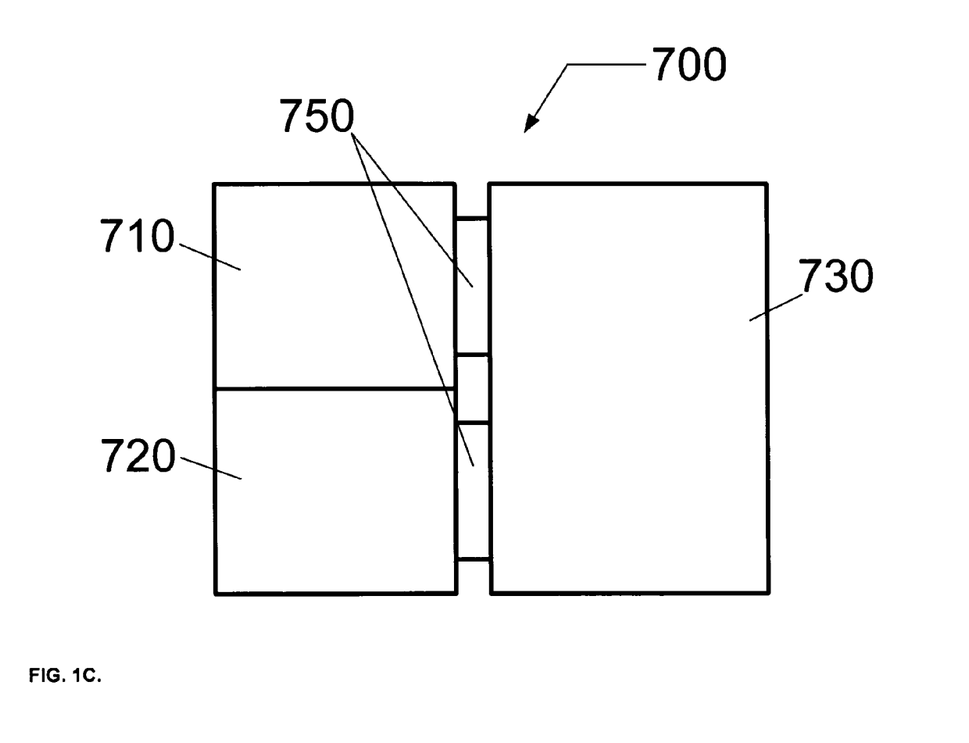
FIG. 1C illustrates a schematic representation of a transfer system having a first treatment system and a second treatment system according to another embodiment of the present invention.

Alternately, in another embodiment, FIG. 1C presents a processing system 700 comprising a first treatment system 710, and a second treatment system 720, wherein the first treatment system 710 is stacked atop the second treatment system 720 in a vertical direction as shown. For example, the first treatment system 710 can comprise a chemical treatment system, and the second treatment system 720 can comprise a thermal treatment system. Alternately, the second treatment system 720 can comprise a substrate rinsing system, such as a water rinsing system. Also, as illustrated in FIG. 1C, a transfer system 730 can be coupled to the first treatment system 710 in order to transfer substrates into and out of the first treatment system 710, and can be coupled to the second treatment system 720 in order to transfer substrates into and out of the second treatment system 720. Additionally, transfer system 730 can exchange substrates with one or more substrate cassettes (not shown). Although only two process systems are illustrated in FIG. 1C, other process systems can access transfer system 730 including such devices as etch systems, deposition systems, coating systems, patterning systems, metrology systems, etc. In order to isolate the processes occurring in the first and second systems, an isolation assembly 750 can be utilized to couple each system. For instance, the isolation assembly 750 comprises a gate valve assembly to provide vacuum isolation. Additionally, the isolation assembly 750 can further comprise a thermal insulation assembly to provide thermal isolation.

In general, at least one of the first treatment system 10 and the second treatment system 20 of the processing system 1 depicted in FIG. 1A comprises at least two transfer openings to permit the passage of the substrate therethrough. For example, as depicted in FIG. 1A, second treatment system 20 comprises two transfer openings, the first transfer opening permits the passage of the substrate between the second treatment system 20 and the transfer system 30 and the second transfer opening permits the passage of the substrate between the second treatment system 20 and the first treatment system 10. However, regarding the processing system 100 depicted in FIG. 1B and the processing system 700 depicted in FIG. 1C, each treatment system 110, 120 and 710, 720, respectively, comprises at least one transfer opening to permit the passage of the substrate therethrough.

Figure 2:
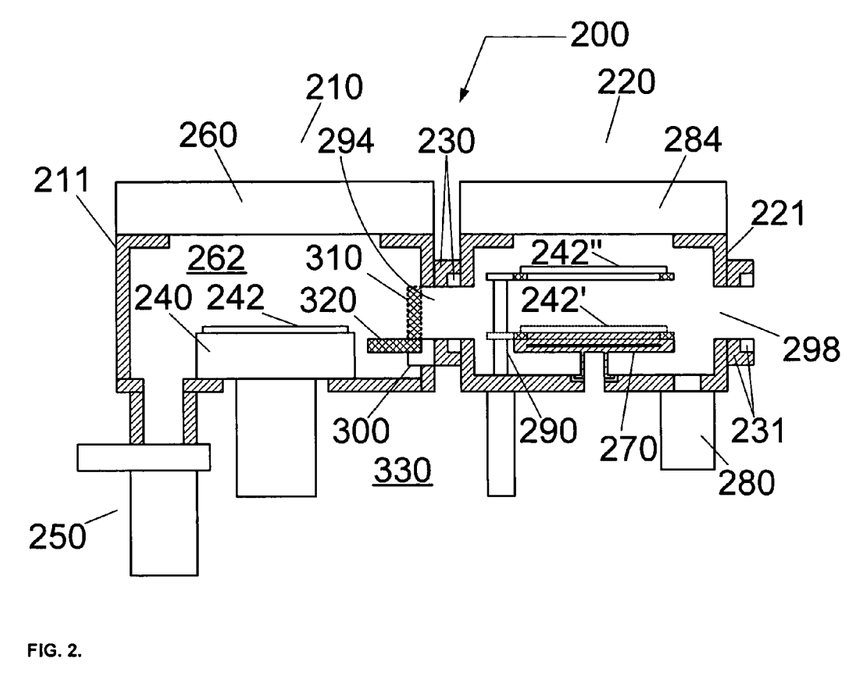
FIG. 2 shows a schematic cross-sectional view of a gate valve assembly for a first treatment system and a second treatment system according to an embodiment of the present invention.

Referring now to FIG. 2, a gate valve assembly 300 is depicted having a gate valve 320 shown in the open position in solid line and in the closed position in dashed line. FIG. 2 illustrates one gate valve, namely, gate valve 320, in two positions including an open position and a closed position.

Although FIG. 2 depicts a gate valve assembly for a first treatment system and a second treatment system utilized for mask trimming, the compact gate valve assembly can be utilized with numerous multi-system arrangements including, but not limited to, etch systems, deposition systems, thermal systems, ion implant systems, etc.

Figure 3A:
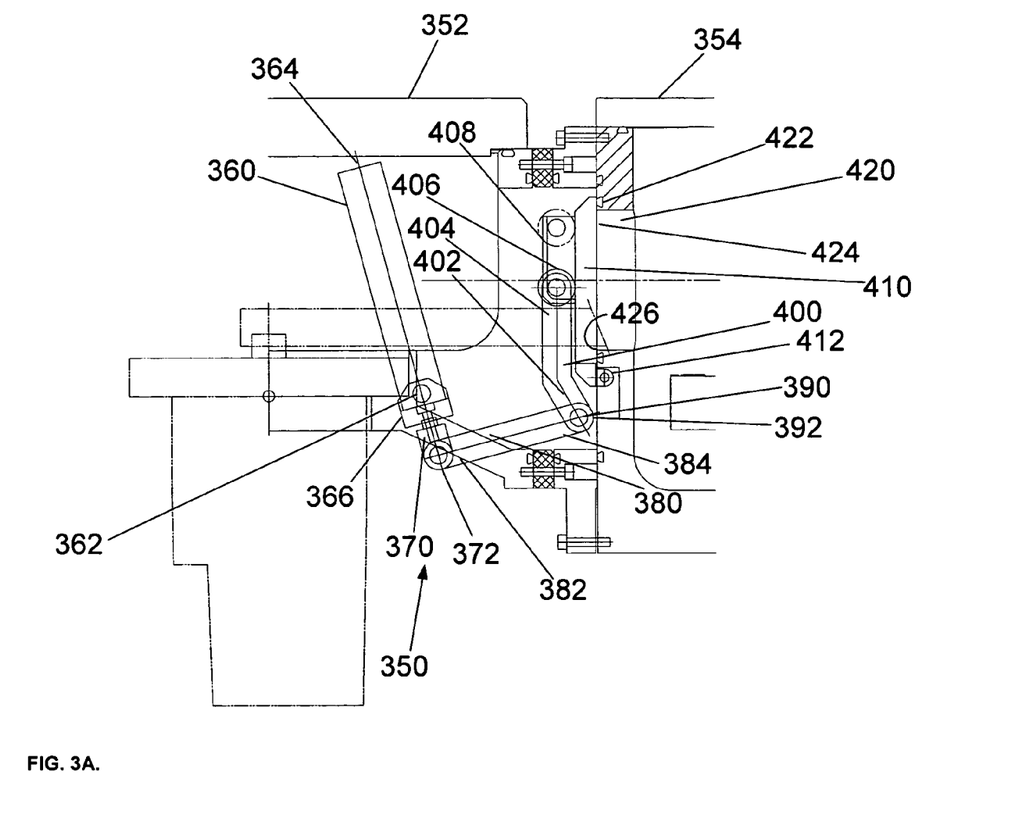
FIGS. 3A and 3B present a gate valve assembly according to an embodiment of the present invention.
Figure 3B:
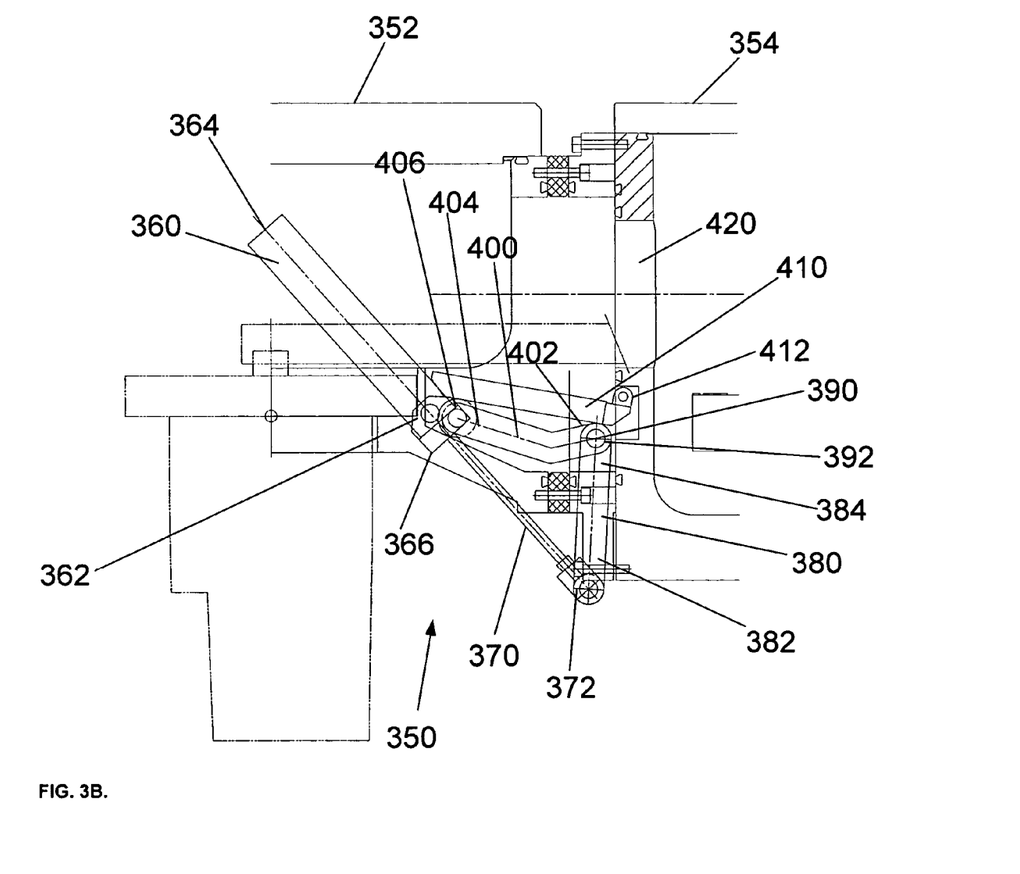

Referring now to FIGS. 3A and 3B, a gate valve assembly 350 for providing vacuum isolation between a first treatment system 352 and a second treatment system 354 is depicted according to one embodiment. The gate valve assembly 350 comprises an actuator 360 coupled to the first treatment system 352 using a first pivot mount 362. The actuator 360 can comprise a first end 364 and a second 366, wherein the second end 366 is configured to couple with an exterior surface of the first treatment system 352, and permit actuator 360 to pivot about first pivot mount 362. The actuator 360 can include a pneumatic actuator. Additionally, the first pivot mount 362 can include a trunion mount.

An actuator assembly includes an actuator arm 370 configured to slidably extend from the second end 366 of actuator 360. The actuator assembly further comprises a linkage arm 380 coupled to the actuator arm 370, a shaft 390 coupled to the linkage arm 380, and a lever arm 400 coupled to the shaft 390. Actuator arm 370 comprises a distal end 372 that is configured to couple with the linkage arm 380 forming a hinge point where the distal end 372 of actuator arm 370 rotatably couples to a first linkage end 382 of linkage arm 380. A second linkage end 384 of linkage arm 380 is configured to fixedly couple with the shaft 390 extending through at least one of the first treatment system 352 and the second treatment system 354 via a vacuum feed-through 392. The vacuum feed-through 392 comprises a rotational vacuum feed-through, such as a model FRM-125 rotary feed-through commercially available from MDC Vacuum Products Corporation. For example, actuator 360, actuator arm 370, and linkage arm 380 remain outside of the first and second treatment systems 352 and 354 (outside vacuum), whereas lever arm 400 remains within the first and second treatment systems 352 and 354 (within vacuum). The shaft 390 is constrained to rotate about its longitudinal axis. The lever arm 400 comprises a first lever end 402 fixedly coupled to shaft 390 and a second lever end 404 having a roller 406 slidably coupled to a roller actuator 408 coupled to an isolation gate 410. Therefore, upon rotation of shaft 390, lever arm 400 acts as a moment arm. The isolation gate 410 is rotatably coupled to at least one of the first treatment system 352 and the second treatment system 354 via a gate hinge 412. As shaft 390 rotates, lever arm 400 rotates, thus, translating roller 406 along roller actuator 408 and causing isolation gate 410 to rotate about gate hinge 412.

As illustrated in FIG. 3A, when the actuator arm 370 is substantially withdrawn within actuator 360, the isolation gate 410 is in a closed position, wherein transfer slot 420 is sealed closed upon the compression of sealing device 422 between a first sealing surface 424 on isolation gate 410 and a second sealing surface 426 on at least one of the first treatment system 352 and the second treatment system 354. The sealing device 422 can, for example, comprise an elastomer O-ring coupled to an O-ring groove. As illustrated in FIG. 3B, when actuator arm 370 is substantially extended from actuator 360, the isolation gate 410 is in an open position, wherein transfer slot 420 is open for the passage of a substrate.

Figure 4A:
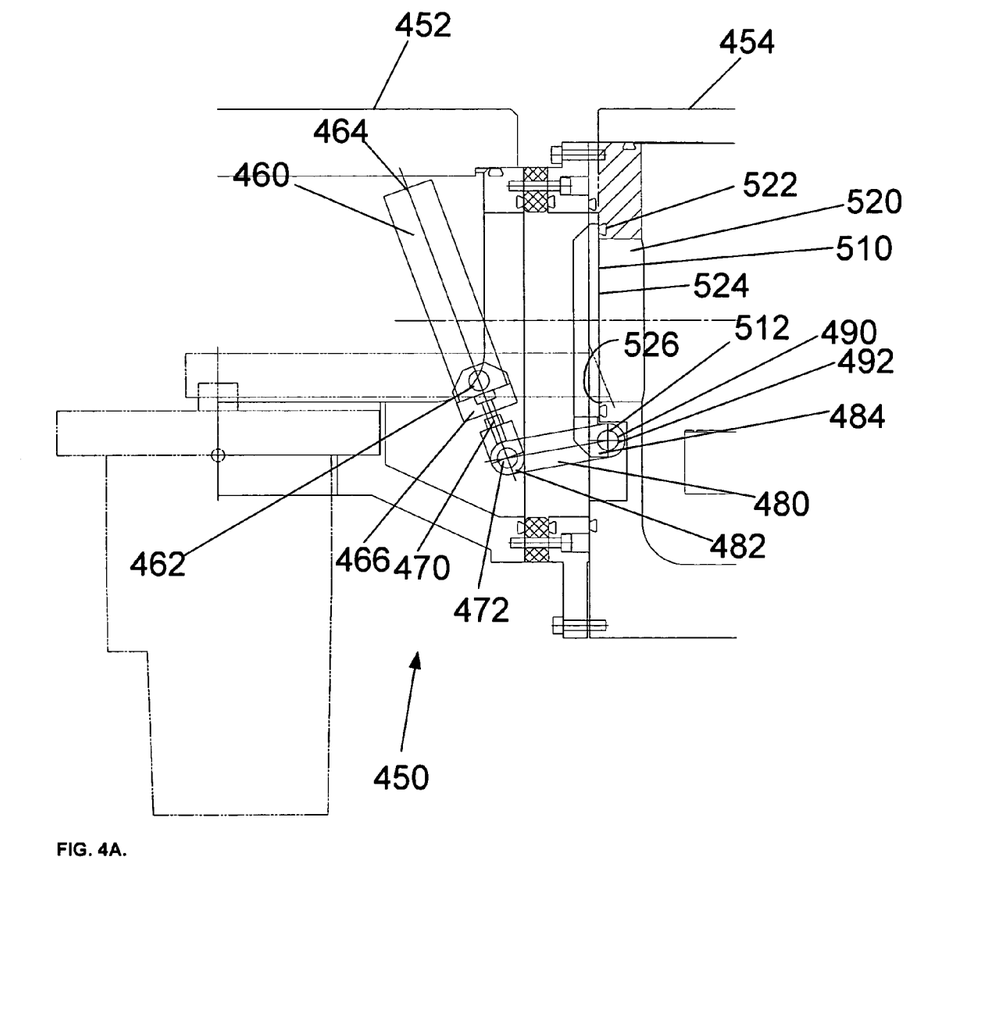
FIGS. 4A and 4B present a gate valve assembly according to another embodiment of the present invention.
Figure 4B:
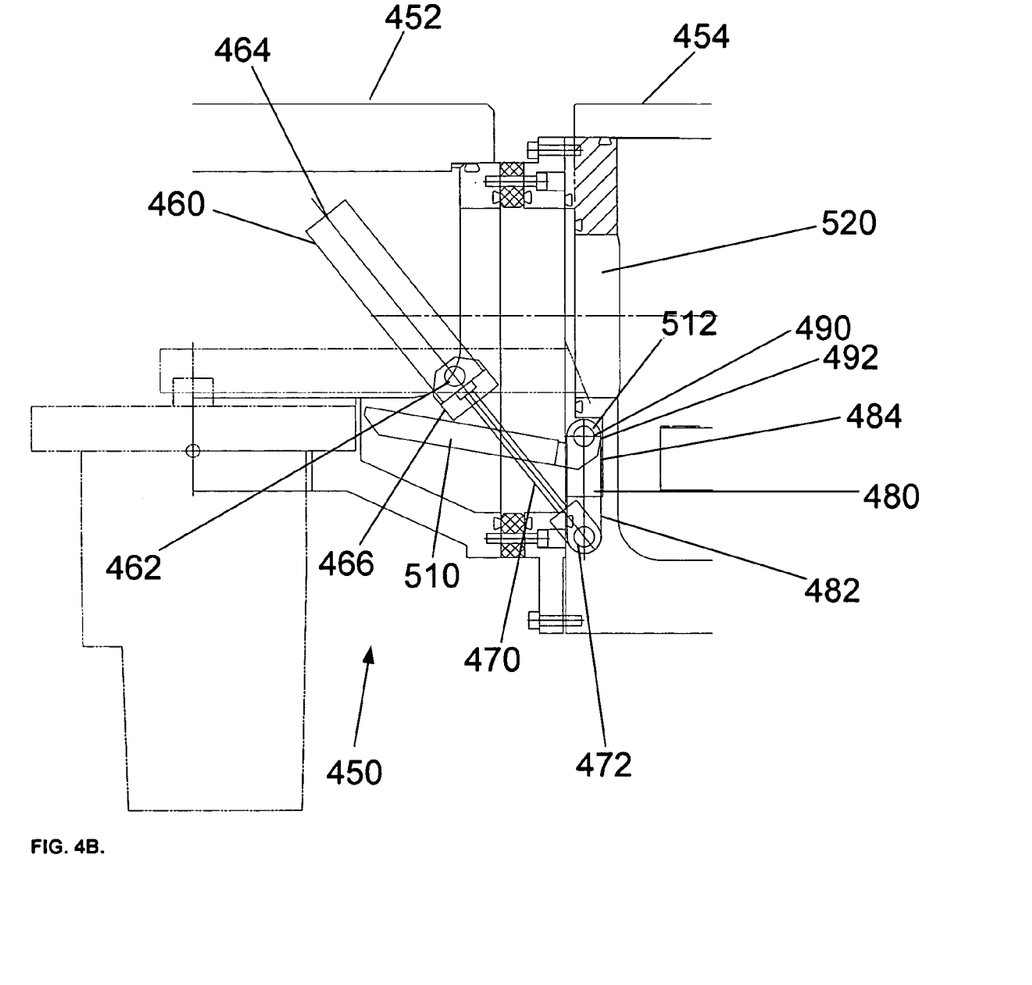

Referring now to FIGS. 4A and 4B, a gate valve assembly 450 for providing vacuum isolation between a first treatment system 452 and a second treatment system 454 is depicted according to another embodiment. The compact gate valve assembly 450 comprises an actuator 460 coupled to the first treatment system 452 using a first pivot mount 462. For example, the actuator 460 can comprise a first end 464 and a second 466, wherein the second end 466 is configured to couple with an exterior surface of the first treatment system 452, and permit actuator 460 to pivot about first pivot mount 462. The actuator 460 can include a pneumatic actuator. Additionally, the first pivot mount 462 can include a trunion mount.

An actuator assembly includes an actuator arm 470 configured to slidably extend from the second end 466 of actuator 460. The actuator assembly further comprises a linkage arm 480 coupled to the actuator arm 470, and a shaft 490 coupled to the linkage arm 480. Actuator arm 470 comprises a distal end 472 that is configured to couple with the linkage arm 480 forming a hinge point where the distal end 472 of actuator arm 470 rotatably couples to a first linkage end 482 of linkage arm 480. A second linkage end 484 of linkage arm 480 is configured to fixedly couple with the shaft 490 extending through at least one of the first treatment system 452 and the second treatment system 454 via a vacuum feed-through 492. The vacuum feed-through 492 comprises a rotational vacuum feed-through, such as a model FRM-125 rotary feed-through commercially available from MDC Vacuum Products Corporation. For example, actuator 460, actuator arm 470, and linkage arm 480 remain outside of the first and second treatment systems 452 and 454 (outside vacuum). The shaft 490 is constrained to rotate about its longitudinal axis. An isolation gate 510 is fixedly coupled to a gate hinge 512, which is coupled to the shaft 490, and is configured to rotate with the rotation of shaft 490. The isolation gate 510 is rotatably coupled to at least one of the first treatment system 452 and the second treatment system 454 via gate hinge 512.

As illustrated in FIG. 4A, when the actuator arm 470 is substantially withdrawn into actuator 460, the isolation gate 510 is in a closed position, wherein transfer slot 520 is sealed closed upon the compression of sealing device 522 between a first sealing surface 524 on isolation gate 510 and a second sealing surface 526 on at least one of the first treatment system 452 and the second treatment system 454. The sealing device 522 can, for example, comprise an elastomer O-ring coupled to an O-ring groove. As illustrated in FIG. 4B, when actuator arm 470 is substantially extended from the actuator 460, the isolation gate 510 is in an open position, wherein transfer slot 520 is open for the passage of a substrate.

Figure 5A:
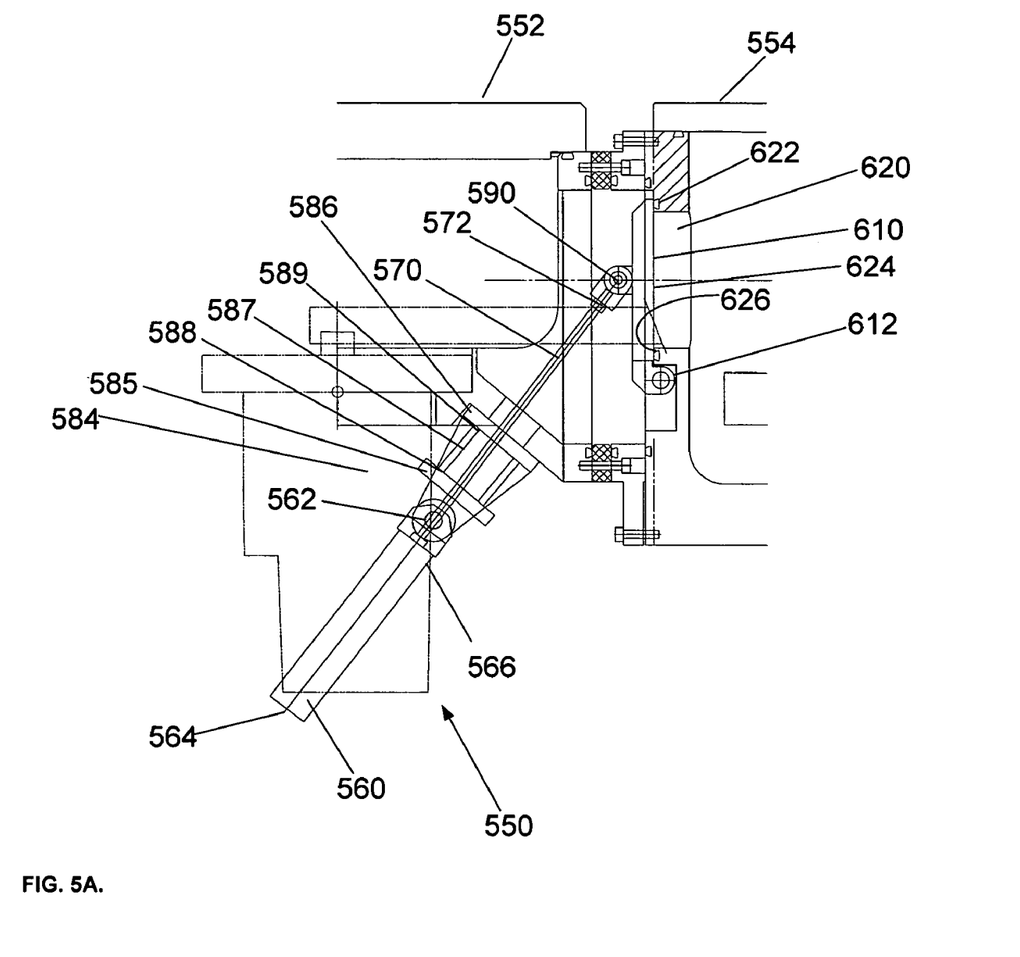
FIGS. 5A and 5B present a gate valve assembly according to another embodiment of the present invention.
Figure 5B:
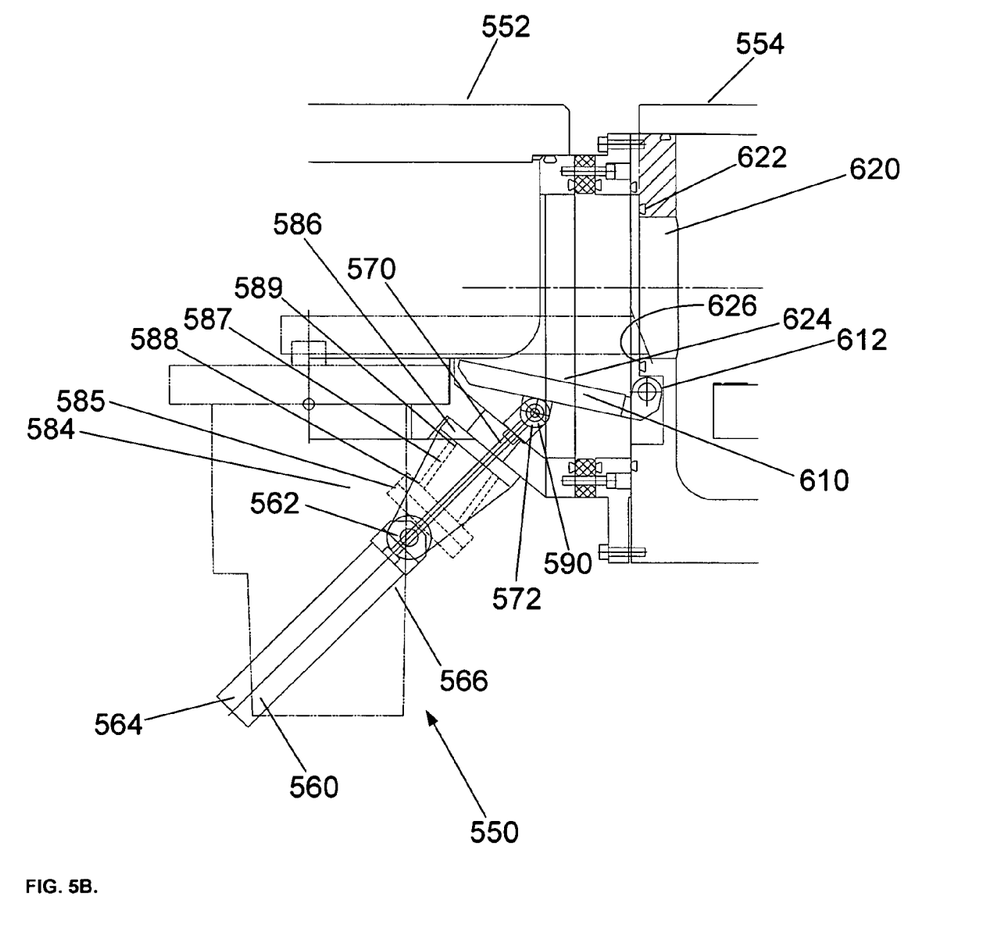

Referring now to FIGS. 5A and 5B, a gate valve assembly 550 for providing vacuum isolation between a first treatment system 552 and a second treatment system 554 is depicted according to another embodiment. The gate valve assembly 550 comprises an actuator 560 coupled to the first treatment system 552 using a first pivot mount 562. For example, the actuator 560 can comprise a first end 564 and a second end 566, wherein the second end 566 is configured to couple with an exterior surface of the first treatment system 552, and permit actuator 560 to pivot about first pivot mount 562. The actuator 560 can include a pneumatic actuator. Additionally, the first pivot mount 562 can include a trunion mount.

An actuator assembly having an actuator arm 570 configured to slidably extend from the second end 566 of actuator 560. Actuator arm 570 comprises a distal end 572 that is configured to couple with a pivot hinge 590 forming a hinge point where the distal end 572 of actuator arm 570 rotatably couples to an isolation gate 610. The isolation gate 610 is fixedly coupled to a gate hinge 612, and is configured to rotate about gate hinge 612 with the translation of actuator arm 570. The isolation gate 610 is rotatably coupled to at least one of the first treatment system 552 and the second treatment system 554 via gate hinge 612. The vacuum within first treatment system 552 and second treatment system 554 is preserved using a vacuum feed-through 584. Vacuum feed-through 584 comprises a first end plate 585 sealably coupled to the actuator 560, a second end plate 586 sealably coupled to at least one of the first treatment system 552 and the second treatment system 554, and a bellows 587 having a first bellows end 588 sealably coupled to the first end plate 585 and a second bellows end 589 sealably coupled to the second end plate 586. As the actuator arm 570 extends from and withdraws into actuator 560, the bellows 587 compresses and expands, respectively, to preserve vacuum in first treatment system 552 and second treatment system 554. For example, actuator 560, and first end plate 585, remain outside of the first and second treatment systems 452 and 454 (outside vacuum), whereas actuator arm 570 remains within the first and second treatment systems 552 and 554 (inside vacuum).

As illustrated in FIG. 5A, when the actuator arm 570 is substantially extended from actuator 560, the isolation gate 610 is in a closed position, wherein transfer slot 620 is sealed closed upon the compression of sealing device 622 between a first sealing surface 624 on isolation gate 610 and a second sealing surface 626 on at least one of the first treatment system 552 and the second treatment system 554. The sealing device 622 can, for example, comprise an elastomer O-ring coupled to an O-ring groove. As illustrated in FIG. 5B, when actuator arm 570 is substantially withdrawn into the actuator 560, the isolation gate 610 is in an open position, wherein transfer slot 620 is open for the passage of a substrate.

Although only certain embodiments of this invention have been described in detail above, those skilled in the art will readily appreciate that many modifications are possible in the embodiments without materially departing from the novel teachings and advantages of this invention. Accordingly, all such modifications are intended to be included within the scope of this invention.

What is claimed is:

1. A gate valve assembly for providing vacuum isolation between a first treatment system and a second treatment system comprising:
   an actuator rotatably coupled to at least one of said first treatment system and said second treatment system;
   an actuator assembly comprising an actuator arm slidably coupled to said actuator, said actuator arm having a distal end;
   a vacuum feed-through coupled to said actuator assembly and at least one of said first treatment system and said second treatment system, and configured to preserve vacuum with said first treatment system and said second treatment system; and
   an isolation gate coupled to said distal end of said actuator arm having a gate hinge coupled to at least one of said first treatment system and said second treatment system, and configured to rotate about said gate hinge,
   wherein a translation of said actuator arm by said actuator causes said isolation gate to rotate about said gate hinge, to close a transfer slot between said first treatment system and said second treatment system, or open said transfer slot between said first treatment system and said second treatment system, and wherein
   either the first treatment system or the second treatment system includes a wall wherein the transfer slot is located, the transfer slot being configured to be sealed closed upon the compression of a sealing device which thereby provides a vacuum seal between the first treatment system and the second treatment system.

2. The compact gate valve assembly of claim 1, wherein said vacuum feed-through comprises a bellows assembly having a first end plate sealably coupled to said actuator, a second endplate sealably coupled to at least one of said first treatment system and said second treatment system, and a bellows having a first bellows end sealably coupled to said first end plate and a second bellows end sealably coupled to said second end plate.

3. The compact gate valve assembly of claim 1, wherein said actuator comprises a first end and a second end, said second end of said actuator is coupled to at least one of said first treatment system and said second treatment system via a trunion mount.

4. The compact gate valve assembly of claim 1, wherein said distal end of said actuator arm is rotatably coupled to said isolation gate via a pivot hinge.

5. The compact gate valve assembly of claim 1, wherein an extension of said actuator arm from said actuator causes said isolation gate to close and seal said transfer slot between said first treatment system and said second treatment system, and a withdrawal of said actuator arm into said actuator causes said isolation gate to open.

6. The compact gate valve assembly of claim 5, wherein said vacuum feed-through comprises a rotational vacuum feed-through.

7. The compact gate valve assembly of claim 1, wherein said actuator assembly further comprises a linkage arm having a first linkage end rotatably coupled to said distal end of said actuator arm, a shaft fixedly coupled to a second linkage end on said linkage arm and configured to extend through at least one of said first treatment system and said second treatment system via said vacuum feed-through, and coupled with said gate hinge.

8. The compact gate valve assembly of claim 1, wherein a withdrawal of said actuator arm into said actuator causes said isolation gate to close and seal said transfer slot between said first treatment system and said second treatment system, and an extension of said actuator arm from said actuator causes said isolation gate to open.

9. The compact gate valve assembly of claim 1, wherein said actuator assembly further comprises a linkage arm having a first linkage end rotatably coupled to said distal end of said actuator arm, a shaft fixedly coupled to a second linkage end on said linkage arm and configured to extend through at least one of said first treatment system and said second treatment system via said vacuum feed-through, a lever arm having a first lever end fixedly coupled to said shaft and a second lever end having a roller slidably coupled to a roller actuator coupled to said isolation gate.

10. The compact gate valve assembly of claim 9, wherein said vacuum feed-through comprises a rotational vacuum feed-through.

11. The compact gate valve assembly of claim 9, wherein a withdrawal of said actuator arm into said actuator causes said isolation gate to close and seal said transfer slot between said first treatment system and said second treatment system, and an extension of said actuator arm from said actuator causes said isolation gate to open.

12. A method of operating a compact gate valve assembly for providing vacuum isolation between a first treatment system and a second treatment system comprising:
   translating an actuator assembly using an actuator rotatably coupled to at least one of said first treatment system and said second treatment system, wherein said actuator assembly comprises an actuator arm slidably coupled to said actuator configured to extend through a vacuum feed-through coupled to said actuator assembly and at least one of said first treatment system and said second treatment system, and couple with an isolation gate having a gate hinge coupled to at least one of said first treatment system and said second treatment system; and
   rotating said isolation gate about said gate hinge in a first direction to close a transfer slot between said first treatment system and said second treatment system, and in a second direction opposing said first direction to open said transfer slot,
   wherein either the first treatment system or the second treatment system includes a wall wherein the transfer slot is located, the transfer slot being configured to be sealed closed upon the compression of a sealing device which thereby provides a vacuum seal between the first treatment system and the second treatment system.

13. A method of operating a compact gate valve assembly for providing vacuum isolation between a first treatment system and a second treatment system comprising: translating an actuator assembly using an actuator rotatably coupled to at least one of said first treatment system and said second treatment system, wherein said actuator assembly comprises an actuator arm slidably coupled to said actuator, a linkage arm having a first linkage end rotatably coupled to a distal end of said actuator arm, a shaft fixedly coupled to a second linkage end on said linkage arm and configured to extend through at least one of said first treatment system and said second treatment system via a vacuum feed-through, an isolation gate having a gate hinge, and a lever arm having a first lever end fixedly coupled to said shaft and a second lever end having a roller slidably coupled to a roller actuator coupled to said isolation gate; and
   rotating said isolation gate about said gate hinge in a first direction to close a transfer slot between said first treatment system and said second treatment system, and in a second direction opposing said first direction to open said transfer slot, wherein either the first treatment system or the second treatment system includes a wall wherein the transfer slot is located, the transfer slot being configured to be sealed closed upon the compression of a sealing device which thereby provides a vacuum seal between the first treatment system and the second treatment system.

14. A method of operating a compact gate valve assembly for providing vacuum isolation between a first treatment system and a second treatment system comprising:

translating an actuator assembly using an actuator rotatably coupled to at least one of said first treatment system and said second treatment system, wherein said actuator assembly comprises an actuator arm slidably coupled to said actuator, a shaft fixedly coupled to a distal end of said actuator arm and configured to extend through at least one of said first treatment system and said second treatment system via a vacuum feed-through, and an isolation gate having a gate hinge fixedly coupled to said shaft; and rotating said isolation gate about said gate hinge in a first direction to close a transfer slot between said first treatment system and said second treatment system, and in a second direction opposing said first direction to open said transfer slot, wherein either the first treatment system or the second treatment system includes a wall wherein the transfer slot is located, the transfer slot being configured to be sealed closed upon the compression of a sealing device which thereby provides a vacuum seal between the first treatment system and the second treatment system.

* * * * *